Patented Aug. 11, 1942

2,292,570

UNITED STATES PATENT OFFICE 2,292,570

PROCESS FOR THE PRODUCTION OF CATALYSTS

Richard Klemm and Eduard Linckh, Ludwigshafen-on-the-Rhine, Germany, assignors, by mesne assignments, to Standard Catalytic Company, a corporation of Delaware No Drawing. Application June 15, 1940, Serial No. 340,768. In Germany November 12, 1938

4 Claims. (Cl. 252—256)

The present invention relates to an improved process for the production of catalysts.

Catalysts consisting of metals of the iron group, especially of iron, or containing these metals as an essential constituent, have been employed in various forms for carrying out chemical reactions, especially for the manufacture of hydrocarbons containing more than one carbon atom in the molecule, and/or of liquid oxygen derivatives of hydrocarbons from carbon monoxide and hydrogen and for the synthesis of ammonia from nitrogen and hydrogen. Catalysts prepared by burning iron or other metals of the iron group, preferably admixed with activating substances, by means of oxygen and reducing the resulting fused oxides, as for example ferrosoferric oxide, with hydrogen at a temperature between about 400° and 800° C., have also been employed for the said purposes. These catalysts are hard masses which are very resistant to mechanical stress and have a comparatively coarse crystalline structure. In view of the compact condition of the fused metal oxides, the metals obtained therefrom by reducing are also very compact, and owing to this property they have a considerably smaller free and active surface than catalysts prepared in another way, and they therefore require a higher reaction temperature than the latter for the production of the same yields of the desired products.

For the conversion of carbon monoxide and hydrogen into hydrocarbons containing more than one carbon atom in the molecule and/or into liquid oxygen-derivatives of hydrocarbons catalysts have also been used which have been prepared by sintering pulverulent metals of the iron group, especially iron, or compounds of these metals, preferably while simultaneously reducing them in the presence of hydrogen.

We have now found that highly active and stable catalysts may be prepared by treating metals of the iron group, especially iron, or their oxides, preferably sesquioxides, advantageously in admixture with activating additions, with steam, to which hydrogen has been added (as a rule in an amount of from 5 to 50 per cent), at high temperatures, preferably at temperatures above 600° C. and more particularly at between 800° and 1200° C., and reducing the oxides thus obtained. In the said treatment, the mixture of steam and hydrogen is preferably employed in a slow stream. In case the catalysts are to be used for reactions with materials exerting a reducing action, the reduction need not be carried out beforehand, but may take place during the reaction.

In order to render the mass mechanically stable after shaping, the original oxide, for example, is mixed preferably with a small quantity of a binder, such as for instance dextrine, and the mixture is pressed in matrices or extrusion presses or dried completely in the form of a thin cake and reduced to small pieces by breaking or cutting.

The treatment with steam at the said temperatures is generally carried out for several hours, preferably from about 6 to about 12 hours.

During this treatment the oxides of the iron metals take up the activating additions in their crystal system whereby the crystal lattice is disturbed. Thus the spinel type crystals of ferrosoferric oxide which are regular and optically isotropic are rendered distinctly anisotropic by the introduction of the activating additions. The said disturbance of the lattice and the uniform distribution of the activating additions are possibly the cause of the particular catalytic properties of the catalysts prepared in the said manner.

When using metals as starting materials, it is preferable to start from a metal powder or metal spangles, to press these into pills or other shapes, preferably after mixing them with the said additions, whereupon the shaped bodies are treated with the mixture of steam and hydrogen. The metals as well as the metal oxides, are thus converted into mixed oxides of the type of ferrosoferric oxide, and the additions are likewise taken up in part into the crystal system of the said oxides with the formation of substances having a high catalytic activity. It is surprising that by the treatment with superheated steam alone the metals are not or only superficially converted into the said mixed oxides of the type of ferrosoferric oxide; probably they are coated only with a thin oxidic layer which prevents the steam from penetrating any further into the interior of the metal particles. However, when the steam contains an addition of hydrogen, the metals are easily completely converted into the said mixed oxides of the type of ferrosoferric oxide.

The method of preparation according to the present invention has also the advantage over that of burning the metals with oxygen while melting that losses of additional substances by evaporation or atomization are practically avoided. Furthermore the catalysts prepared according to this invention, while having the same mechanical strength as the latter, are characterized by a superior porosity and a crystal structure of greater uniformity and fineness, which imparts to them a larger active surface area and an increased activity and thus allows of carrying out the desired reaction at lower temperatures.

The hydrogen may be added to the steam in any desired manner. We have found that hydrogen which has been generated directly before use by splitting steam over red-hot iron, for example iron rings, acts more rapidly and intensively than ordinary hydrogen from steel bottles, probably because part of the hydrogen is in statu nascendi, i. e., in the atomic state. Ordinary hydrogen when added to steam which has not been pretreated in this manner, yields the same results when working at a somewhat higher temperature and/or for a longer time of treatment. For example when treating ferric oxide, which by from 4 to 6 hours' treatment at 800° to 900° C. with steam having previously been passed over red-hot iron, is converted into the form yielding by reduction the active catalyst, with a steam not having been pretreated in this manner but containing an additional amount of 30 per cent of ordinary hydrogen, the treatment must either be carried out at from 1000° to 1100° C. or conducted for from 12 to 14 hours, in order to obtain the same result.

If a mixture containing ferric oxide is heated in the absence of steam or treated with steam alone at a temperature within the said range or at a higher temperature, the formation of the crystalline catalyst masses of the spinel type structure cannot be observed. When heating in the absence of steam the oxide is only slightly darkened at its outer surface which is apparently due to a partial decomposition of the ferric oxide into ferrosoferric oxide and/or to an increase of the size of the crystal grain of the ferric oxide. By a treatment with steam alone the bodies turn dark grey (probably for the same reason). In both cases they remain soft and friable and the lustrous metallic fracture which is peculiar to the catalyst when heated in the presence of steam and hydrogen is not obtained; besides they are not or only slightly attracted by a magnet whereas that form of the oxide which leads to the active catalyst is attracted almost as strongly as metallic iron. The desired activation is only achieved by the simultaneous treatment with steam and hydrogen at the said temperatures.

When starting from oxides, these need not be in a crystallized state; precipitated oxides, for example, may also be employed in a dry state. Agents promoting crystallization may be dispensed with, since crystallization occurs under the influence of steam.

The catalysts prepared according to the present invention allow of transforming mixtures of carbon monoxide and hydrogen into liquid hydrocarbons with a satisfactory yield also under comparatively low pressures, such as for example 10 atmospheres or lower, and even under atmospheric pressure, while with molten catalysts higher yields can be obtained only difficultly under the said pressures.

The following examples serve to illustrate how the present invention may be carried out in practice, but the invention is not restricted to these examples.

*Example 1*

1430 grams of ferric oxide are intimately mixed with 5 grams of titanium dioxide and 10 grams of calcium oxide and made into a paste with a solution of 5 grams of silver nitrate in 250 cc. of water. The paste is dried and, after incorporating 60 grams of dextrine, slightly moistened with 150 cc. of water and pressed into tablets. The tablets are then treated for 7 hours at between 900 and 950° C. in a current of superheated steam which has been passed over pieces of red-hot iron. The catalyst so prepared is compared with another catalyst prepared by fusing in a current of oxygen a mixture of 1000 grams of iron powder, 5 grams of titanium dioxide and 10 grams of calcium oxide, which has previously been moistened with a solution of 5 grams of silver nitrate in 100 cc. of water. Both catalysts are reduced in a current of hydrogen at 650° C. The reduced catalysts are then arranged in separate vessels and a mixture of about equal parts of carbon monoxide and hydrogen is passed thereover at a rate of 10 liters per hour under a pressure of 100 atmospheres. The reaction products formed are released from pressure and condensed. The catalyst obtained by melting gives a maximum yield (at 330° C.) of 250 cc. of oil and 150 cc. of water containing 10 per cent of alcohols per cubic meter of final gas, whereas the maximum yield obtained with the catalyst according to the present invention at 350° C. is 275 cc. of oil and 137.5 cc. of water containing 20 per cent of alcohols per cubic meter of final gas.

*Example 2*

2475 grams of ferric oxide are carefully mixed with 160 grams of titanium dioxide, 71 grams of manganous oxide, 60 grams of silicic acid, 100 grams of calcium carbonate and a solution of 138 grams of potassium carbonate in 250 grams of water. The composition is made into a thick paste, dried and broken up into cubic pieces having a length of about 1 cm. which are then treated for 8 hours at about 900° C. with steam having been passed over red-hot iron, in the manner described in Example 1. The catalyst so prepared is compared with a catalyst obtained by mixing 1740 grams of iron powder, 160 grams of titanium dioxide, 71 grams of manganous oxide, 29 grams of metallic silicon, 100 grams of calcium carbonate and 138 grams of potassium carbonate, moistening the mixture with 200 cc. of water and melting the whole in a current of oxygen. With a gas mixture consisting of equal parts of carbon monoxide and hydrogen the catalyst prepared according to the present invention yields at 315° C. as the most favourable temperature 350 cc. of oil and 175 cc. of water containing 12 per cent of alcohols per cubic meter of final gas, whereas the molten catalyst yields at 320° C. as the most favourable temperature 300 cc. of oil and 150 cc. of water containing 13.4 per cent of alcohols per each cubic meter of final gas.

*Example 3*

1430 grams of ferric oxide, 25 grams of titanium dioxide, 25 grams of manganous oxide and 25 grams of tungsten trioxide are mixed with a solution of 5 grams of potassium carbonate and 5 grams of sodium carbonate in 150 cc. of water and carefully mixed with 800 grams of dextrine, the whole then being made into a paste. The paste is thereupon dried, broken up into pieces and treated with steam having been passed over red-hot iron at between 900 and 950° C. as described in Example 1. As a comparative catalyst a melt made up of the same constituents but without dextrine and while using 1000 grams of iron instead of the ferric oxide is employed.

With a gas mixture consisting of about equal parts of carbon monoxide and hydrogen the catalyst prepared by treatment with steam containing hydrogen yields at 340° C. as the most favourable temperature 406 cc. of oil and 188 cc. of water containing 16.5 per cent of alcohols, per each cubic meter of final gas, while the catalyst obtained from the said melt yields at 350° C. as the most favourable temperature 375 cc. of oil and 237.5 cc. of water containing 17.5 per cent of alcohols, per cubic meter of final gas.

Example 4

150 grams of commercial aluminum hydroxide are ground together with a solution of 56 grams of potassium hydroxide in 250 grams of water, then heated for 4 hours at from 80 to 90° C. and, after adding 2200 grams of ferric oxide, intimately mixed therewith by grinding while adding 2 liters of water. The mass is then dried in the form of a thin layer and broken up into cubic pieces having a length of about 1 cm. which are thereupon heated for from 8 to 10 hours at 1100° C. in a stream of hydrogen and steam.

After reducing the catalyst with hydrogen at 400° C. a mixture of 1 part of nitrogen and 3 parts of hydrogen is passed thereover under a pressure of 100 atmospheres, the temperature being gradually raised. The ammonia formed is collected and its amount determined.

The catalyst is composed as follows:

$Fe_2O_3$ = 66.73 per cent
$FeO$ = 26.70 per cent
$Al_2O_3$ = 4.55 per cent
$K_2O$ = 0.33 per cent It yields at:

440° C. 31.7 grams of $NH_3$ per cubic meter of initial gas=4.55 per cent by volume.
460° C. 34.6 grams of $NH_3$ per cubic meter of initial gas=4.95 per cent by volume.
480° C. 53.1 grams of $NH_3$ per cubic meter of initial gas=7.60 per cent by volume.
500° C. 57.8 grams of $NH_3$ per cubic meter of initial gas=8.28 per cent by volume.

Example 5

2200 grams of ferric oxide, 150 grams of aluminum hydroxide and 78.6 g. of potassium hydroxide are treated as described in Example 4. The catalyst is reduced with hydrogen at 400° C., whereupon a mixture of 1 part of nitrogen and 3 parts of hydrogen is passed thereover at different temperatures under a pressure of 100 atmospheres. The catalyst has the following composition:

$Fe_2O_3$ = 63.66 per cent
$FeO$ = 30.55 per cent
$Al_2O_3$ = 4.83 per cent
$K_2O$ = 0.11 per cent It yields at:

440° C. 52.10 grams of $NH_3$ per cubic meter of initial gas=7.48 per cent by volume.
460° C. 56.41 grams of $NH_3$ per cubic meter of initial gas=8.10 per cent by volume.
480° C. 80.4 grams of $NH_3$ per cubic meter of initial gas=11.50 per cent by volume.
500° C. 85.4 grams of $NH_3$ per cubic meter of initial gas=12.20 per cent by volume.

Example 6

500 grams of cobalt oxide are carefully mixed with 20 grams of silicic acid hydrate, 9 grams of titanium oxide, 9 grams of manganous oxide and 40 grams of dextrine, made into a thin paste with a solution of 8 grams of potassium hydroxide in 500 cc. of water, spread out in a thin layer and dried. The cake obtained is broken up into pieces having a length of about from 5 to 10 millimeters and treated at about 900° C. with a mixture of steam and 30 per cent of hydrogen whereby hard grains having a lustrous metallic fracture and a fine-grained structure are obtained. These grains are then filled into a reaction vessel and reduced to metallic cobalt at 650° C. By passing over the catalyst so obtained a mixture of 33 per cent of carbon monoxide and 67 per cent of hydrogen at 300° C. under a pressure of 100 atmospheres at a rate of 260 cubic meters (measured under ordinary conditions of temperature and pressure) per hour and per cubic meter of catalyst, 37.0 cc. of hydrocarbon oils and 200 cc. of water containing 3.4 per cent by volume of alcohols are obtained per cubic meter of initial gas.

Example 7

2000 grams of an iron powder prepared by a thermal decomposition of iron carbonyl are suspended in a solution of 10 grams of silver nitrate in 1.5 liter of water. After precipitating the silver up on the iron, the silvered iron is sucked off, washed and dried, whereupon 10 grams of titanium oxide, 20 grams of calcium oxide and 40 grams of dextrine (as a binding agent) are added. The whole is intimately mixed and then pressed into tablets, which are treated for 7 hours at between 800 to 850° C. with a mixture of steam and hydrogen which has been generated just before by passing steam over red-hot iron rings. The catalyst so obtained is then reduced with hydrogen at 650° C. When a mixture of 33 per cent of carbon monoxide and 67 per cent of hydrogen is passed thereover at 320° C. under a pressure of 100 atmospheres, 75.0 cc. of hydrocarbon oils and 225 cc. of water containing 31.0 per cent of alcohols are obtained per cubic meter of initial gas.

What we claim is:

1. A process for the production of a catalyst comprising as an essential constituent a metal of the iron group, which comprises treating a mass comprising a substance selected from the group consisting of the said metals and their oxides at a high temperature with an added mixture of steam and hydrogen, said mixture containing from about 5% to 50% of hydrogen, and reducing the resulting oxidic substance.

2. In the process as claimed in claim 1, effecting the treatment with steam and hydrogen at a temperature above 600° C.

3. In the process as claimed in claim 1, effecting the treatment with steam and hydrogen at a temperature between 800° and 1200° C.

4. In the process as claimed in claim 1, effecting the treatment with a mixture of steam and hydrogen obtained directly before by contacting steam with red-hot iron.

RICHARD KLEMM.
EDUARD LINCKH.